US012591286B2

(12) United States Patent
Byrne et al.

(10) Patent No.: US 12,591,286 B2
(45) Date of Patent: Mar. 31, 2026

(54) CONTROLLING EXECUTION OF ARTIFICIAL INTELLIGENCE WORKLOADS BASED ON PREDICTED POWER CONSUMPTION

(71) Applicant: Dell Products L.P., Round Rock, TX (US)

(72) Inventors: Colin Stewart Byrne, Newmarket on Fergus (IE); Ian Roche, Glanmire (IE)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 18/614,905

(22) Filed: Mar. 25, 2024

(65) Prior Publication Data

US 2025/0298452 A1     Sep. 25, 2025

(51) Int. Cl.
*G06F 1/28* (2006.01)

(52) U.S. Cl.
CPC ..................................... *G06F 1/28* (2013.01)

(58) Field of Classification Search
CPC ......... G06F 1/28; G06F 1/3234; G06F 1/3206
See application file for complete search history.

(56) References Cited

U.S. PATENT DOCUMENTS

| | | | | |
|---|---|---|---|---|
| 8,190,939 | B2 * | 5/2012 | Fields, Jr. ............. | G06F 9/5094 713/323 |
| 8,281,166 | B2 * | 10/2012 | Carroll ................... | G06N 20/00 713/323 |

| | | | | |
|---|---|---|---|---|
| 10,671,147 | B2 * | 6/2020 | Rotem .................. | G06F 1/3287 |
| 11,316,746 | B1 * | 4/2022 | Bitterfeld ............ | H04L 41/5009 |
| 11,334,399 | B2 * | 5/2022 | Heilper ................. | G06F 9/5094 |
| 11,740,687 | B2 * | 8/2023 | Kim ...................... | G06N 3/0499 713/320 |
| 11,741,342 | B2 * | 8/2023 | Zhou .................... | G06N 3/0442 706/25 |
| 12,229,600 | B1 * | 2/2025 | Datta .................... | G06F 9/5077 |
| 12,353,908 | B2 * | 7/2025 | Sivathanu .............. | G06F 9/505 |

(Continued)

OTHER PUBLICATIONS

L. H. Kaack et al., "Aligning Artificial Intelligence with Climate Change Mitigation," hal-03368037, Oct. 6, 2021, 20 pages.

(Continued)

*Primary Examiner* — Aurel Prifti
(74) *Attorney, Agent, or Firm* — Ryan, Mason & Lewis, LLP

(57) ABSTRACT

An apparatus comprises at least one processing device configured to determine, for a first set of artificial intelligence (AI) workloads, a first set of metrics characterizing AI models utilized by the first set of AI workloads and a second set of metrics characterizing power consumption associated with execution of the first set of AI workloads. The at least one processing device is also configured to generate, based on the first and second sets of metrics, a predictive model configured for generating power consumption predictions for a second set of AI workloads, to utilize the predictive model to generate, for a given one of the second set of AI workloads, predicted power consumption associated with execution of the given AI workload on one or more information technology (IT) assets, and to control execution of the given AI workload on a given IT asset based on the predicted power consumption.

20 Claims, 14 Drawing Sheets

(56) References Cited

U.S. PATENT DOCUMENTS

| | | | | |
|---|---|---|---|---|
| 2017/0242472 A1* | 8/2017 | Morad | ................ | G06F 1/3206 |
| 2019/0325305 A1* | 10/2019 | Zhang | ................ | G06N 3/0464 |
| 2021/0117603 A1* | 4/2021 | Jiang | ................ | G06N 3/08 |
| 2022/0035877 A1* | 2/2022 | Nittur Sridhar | ...... | G06F 16/953 |
| 2022/0067453 A1* | 3/2022 | Farhadi | ................ | G06N 3/063 |
| 2022/0076115 A1* | 3/2022 | Nam | ................ | G06N 3/0495 |
| 2022/0131862 A1* | 4/2022 | Patel | ................ | H04L 63/0892 |
| 2022/0327386 A1* | 10/2022 | Ben-dror | ................ | G06N 3/045 |
| 2022/0357985 A1* | 11/2022 | Dean | ................ | G06F 9/5016 |
| 2023/0079975 A1* | 3/2023 | Saeed | ................ | G06N 3/048 |
| | | | | 713/320 |
| 2023/0168925 A1* | 6/2023 | Makaya | ................ | G06F 11/302 |
| | | | | 718/102 |
| 2023/0376663 A1* | 11/2023 | Xi | ................ | G06F 30/331 |
| 2024/0007414 A1* | 1/2024 | Jain | ................ | G06F 9/505 |
| 2024/0094796 A1* | 3/2024 | Narayanaswamy | .... | G06F 1/206 |
| 2024/0273684 A1* | 8/2024 | Wang | ................ | G06N 3/0985 |
| 2024/0362100 A1* | 10/2024 | Zhang | ................ | G06F 11/0757 |
| 2025/0021378 A1* | 1/2025 | Liu | ................ | G06F 9/4881 |
| 2025/0045099 A1* | 2/2025 | Yi | ................ | G06F 11/3409 |
| 2025/0061317 A1* | 2/2025 | Munoz Chiabrando | ................ | |
| | | | | G06N 3/045 |
| 2025/0085971 A1* | 3/2025 | Bouzguarrou | .......... | G06F 9/323 |
| 2025/0124640 A1* | 4/2025 | Lorraine | ................ | G06T 7/97 |

OTHER PUBLICATIONS

Code Carbon, "Track and Reduce CO2 Emissions from your Computing," https://codecarbon.io/, Accessed Jan. 16, 2024, 10 pages.

Dell EMC, "Integrated Dell Remote Access Controller 9 User's Guide," Rev. A02, Dec. 2020, 363 pages.

Dell EMC, "Dell EMC OpenManage Enterprise Version 3.6.1 User's Guide," Rev. A00, Jun. 2021, 177 pages.

Dell Technologies, "Full Access Management of PowerEdge Servers," Solution Brief, Nov. 2023, 2 pages.

Dell Technologies, "Dell CloudIQ: A Detailed Review," White Paper, H15691.9, Oct. 2023, 203 pages.

Dell Technologies, "Transform the way you manage IT with Dell OpenManage Enterprise," Brochure, Nov. 2023, 4 pages.

* cited by examiner

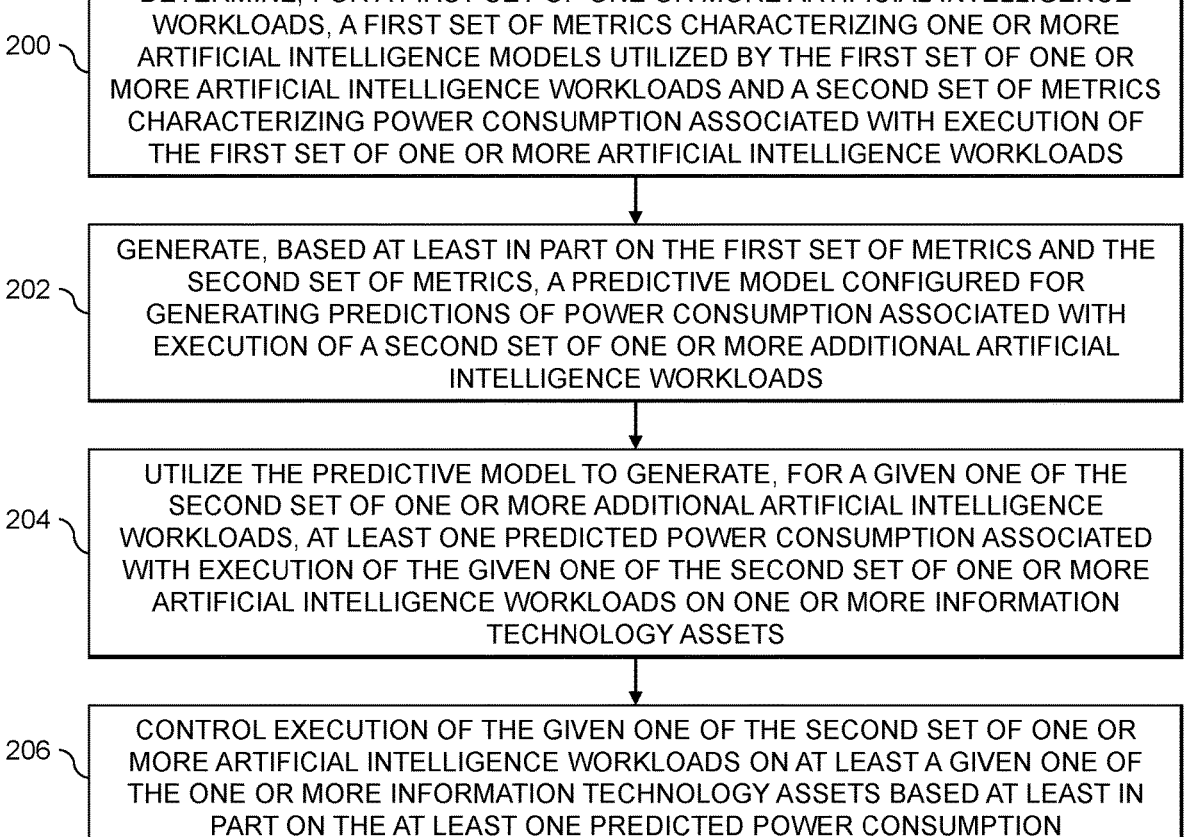

200 — DETERMINE, FOR A FIRST SET OF ONE OR MORE ARTIFICIAL INTELLIGENCE WORKLOADS, A FIRST SET OF METRICS CHARACTERIZING ONE OR MORE ARTIFICIAL INTELLIGENCE MODELS UTILIZED BY THE FIRST SET OF ONE OR MORE ARTIFICIAL INTELLIGENCE WORKLOADS AND A SECOND SET OF METRICS CHARACTERIZING POWER CONSUMPTION ASSOCIATED WITH EXECUTION OF THE FIRST SET OF ONE OR MORE ARTIFICIAL INTELLIGENCE WORKLOADS

202 — GENERATE, BASED AT LEAST IN PART ON THE FIRST SET OF METRICS AND THE SECOND SET OF METRICS, A PREDICTIVE MODEL CONFIGURED FOR GENERATING PREDICTIONS OF POWER CONSUMPTION ASSOCIATED WITH EXECUTION OF A SECOND SET OF ONE OR MORE ADDITIONAL ARTIFICIAL INTELLIGENCE WORKLOADS

204 — UTILIZE THE PREDICTIVE MODEL TO GENERATE, FOR A GIVEN ONE OF THE SECOND SET OF ONE OR MORE ADDITIONAL ARTIFICIAL INTELLIGENCE WORKLOADS, AT LEAST ONE PREDICTED POWER CONSUMPTION ASSOCIATED WITH EXECUTION OF THE GIVEN ONE OF THE SECOND SET OF ONE OR MORE ARTIFICIAL INTELLIGENCE WORKLOADS ON ONE OR MORE INFORMATION TECHNOLOGY ASSETS

206 — CONTROL EXECUTION OF THE GIVEN ONE OF THE SECOND SET OF ONE OR MORE ARTIFICIAL INTELLIGENCE WORKLOADS ON AT LEAST A GIVEN ONE OF THE ONE OR MORE INFORMATION TECHNOLOGY ASSETS BASED AT LEAST IN PART ON THE AT LEAST ONE PREDICTED POWER CONSUMPTION

FIG. 2

Figure 3:
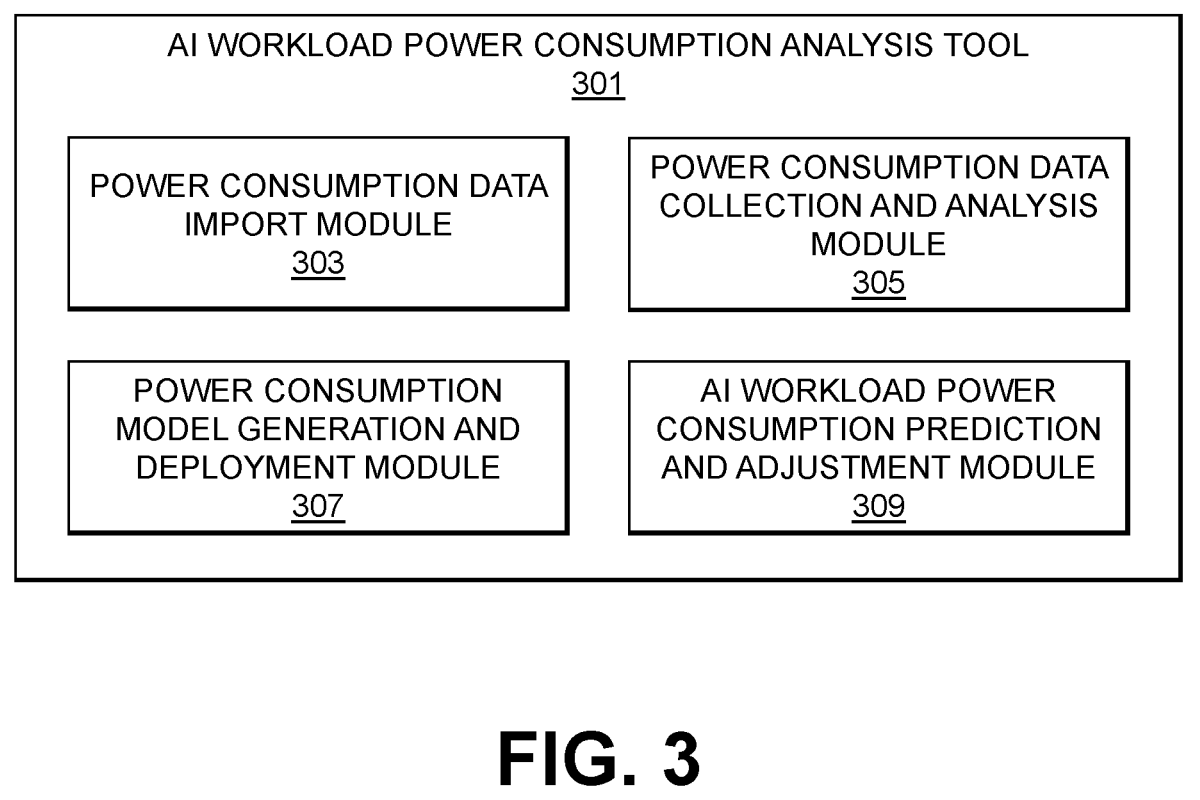

AI WORKLOAD POWER CONSUMPTION ANALYSIS TOOL
301

POWER CONSUMPTION DATA IMPORT MODULE
303

POWER CONSUMPTION DATA COLLECTION AND ANALYSIS MODULE
305

POWER CONSUMPTION MODEL GENERATION AND DEPLOYMENT MODULE
307

AI WORKLOAD POWER CONSUMPTION PREDICTION AND ADJUSTMENT MODULE
309

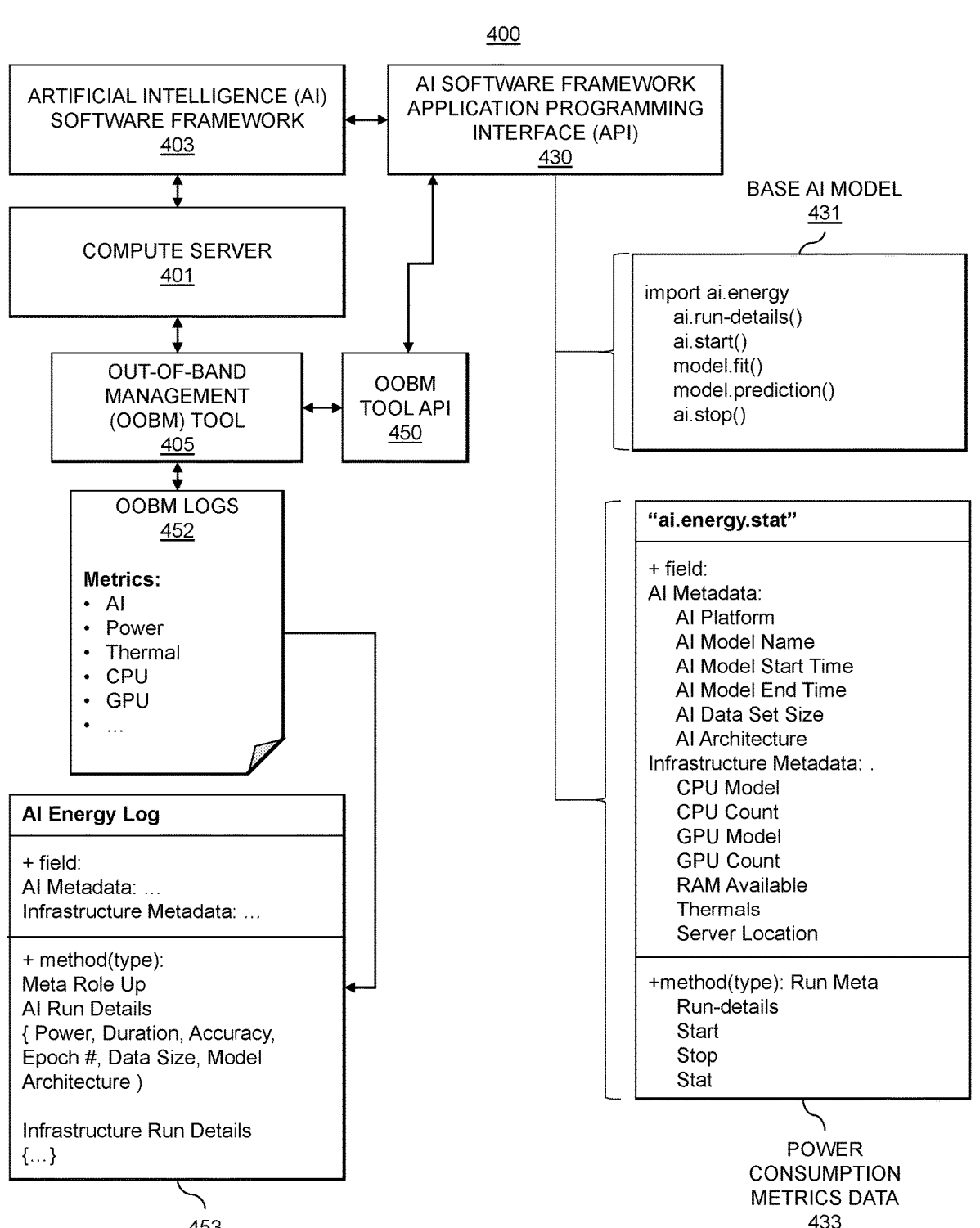

ARTIFICIAL INTELLIGENCE (AI)
SOFTWARE FRAMEWORK
403

AI SOFTWARE FRAMEWORK
APPLICATION PROGRAMMING
INTERFACE (API)
430

BASE AI MODEL
431

COMPUTE SERVER
401

```
import ai.energy
    ai.run-details()
    ai.start()
    model.fit()
    model.prediction()
    ai.stop()
```

OUT-OF-BAND
MANAGEMENT
(OOBM) TOOL
405

OOBM
TOOL API
450

OOBM LOGS
452

Metrics:
- AI
- Power
- Thermal
- CPU
- GPU
- ...

"ai.energy.stat"

+ field:
AI Metadata:
    AI Platform
    AI Model Name
    AI Model Start Time
    AI Model End Time
    AI Data Set Size
    AI Architecture
Infrastructure Metadata: .
    CPU Model
    CPU Count
    GPU Model
    GPU Count
    RAM Available
    Thermals
    Server Location +method(type): Run Meta
    Run-details
    Start
    Stop
    Stat

AI Energy Log

+ field:
AI Metadata: ...
Infrastructure Metadata: ...

+ method(type):
Meta Role Up
AI Run Details
{ Power, Duration, Accuracy,
Epoch #, Data Size, Model
Architecture )

Infrastructure Run Details
{...}

453

POWER
CONSUMPTION
METRICS DATA
433

FIG. 4

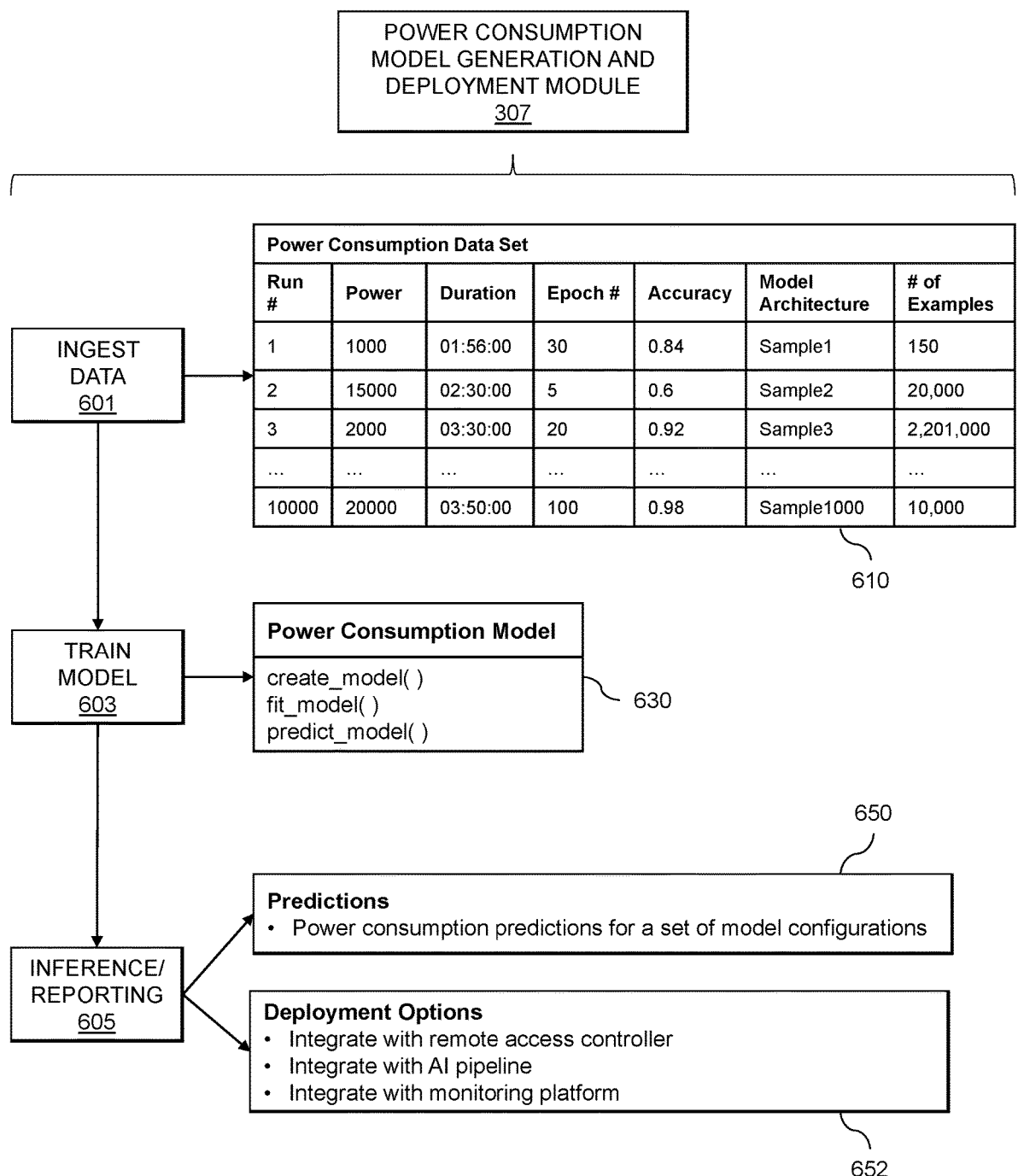

POWER CONSUMPTION
MODEL GENERATION AND
DEPLOYMENT MODULE
307

Power Consumption Data Set

| Run # | Power | Duration | Epoch # | Accuracy | Model Architecture | # of Examples |
|---|---|---|---|---|---|---|
| 1 | 1000 | 01:56:00 | 30 | 0.84 | Sample1 | 150 |
| 2 | 15000 | 02:30:00 | 5 | 0.6 | Sample2 | 20,000 |
| 3 | 2000 | 03:30:00 | 20 | 0.92 | Sample3 | 2,201,000 |
| ... | ... | ... | ... | ... | ... | ... |
| 10000 | 20000 | 03:50:00 | 100 | 0.98 | Sample1000 | 10,000 |

610

INGEST
DATA
601

Power Consumption Model create_model( )
fit_model( )
predict_model( )

630

TRAIN
MODEL
603

650

Predictions
• Power consumption predictions for a set of model configurations

INFERENCE/
REPORTING
605

Deployment Options
• Integrate with remote access controller
• Integrate with AI pipeline
• Integrate with monitoring platform

```
import ai.energy

# Record/Log Infrastructure Details
    ai.run-details()
    ai.start()
    ai.stop()

# Predict AI/ML Power Consumption
    ai.predict()

# Other Methods
    ai.runtime-details()
    ai.stat()
```

705

| Method | Example/Description |
|---|---|
| .run.details() | Expose and record pertinent metadata |
| .start() | Capture power at system and component level at beginning of AI/ML run. |
| .stop() | Generate Predicted AI Power Consumption (PAIPC) data set including power consumption details. Subsequently generate PAIPC AI/ML model. |
| … | … |
| .predict() | Make prediction on future AI/ML power consumption based on new data. |
| .runtime-details() | Display real time PAIPC data set for current run. |
| .start() | Display size of PAIPC data set |

| Metadata Type: AI | |
|---|---|
| Feature | Example/Description |
| Platform | AI Framework (e.g., Tensorflow, torch, keras, etc.) |
| Model Name | User-defined name for tracking |
| Start Time | Wall clock date/time (e.g., 12:00:00 01/01/2024) |
| End Time | Wall clock date/time (e.g., 12:00:00 01/01/2024) |
| Data Set Size | Size of data set, including features and number of samples |
| Architecture | Model summary, detailing model parameters and complexity |

805

| Metadata Type: Infrastructure | |
|---|---|
| Feature | Example/Description |
| CPU Model | Sample CPU Type |
| CPU Count | 2 |
| GPU Model | Sample GPU Type |
| GPU Count | 4 |
| RAM Available | System: 1TB DDR5 EEC<br>Accelerator Memory: 192GB |
| Thermals | Thermal characteristics for each component |

| Power Consumption Data Set | | | | | | | | | |
|---|---|---|---|---|---|---|---|---|---|
| Run # | Duration | Epoch # | Accuracy | Model Architecture | AI Metadata | Infrastructure Metadata | # of Examples | Power | |
| 1 | 01:56:00 | 30 | 0.84 | Sample1 | ... | ... | 150 | 1000 | |
| 2 | 02:30:00 | 5 | 0.6 | Sample2 | ... | ... | 20,000 | 15000 | |
| 3 | 03:30:00 | 20 | 0.92 | Sample3 | ... | ... | 2,201,000 | 2000 | |
| ... | ... | ... | ... | ... | ... | ... | ... | ... | |
| 10000 | 03:50:00 | 100 | 0.98 | Sample1000 | ... | ... | 10,000 | 20000 | |

905

```
train_model()
Model: "sequential_9"
-----------------------------------------------------------------
Layer (type)                Output Shape            Parameter #
-----------------------------------------------------------------
layers_flatten (Flatten)    (None, 784)             0
layers_dense (Dense)        (None, 512)             401920
layers_dropout (Dropout)    (None, 512)             0
layers_dense_2 (Dense)      (None, 10)              5130
=================================================================
Total parameters: 407050 (1.55MB)
Trainable parameters: 407050 (1.55MB)
Non-trainable parameters: 0 (0.00 Byte)
-----------------------------------------------------------------
Epoch 1/5
1875/1875 [==================] – 18s – 9ms/step – loss: 0.4954 –
accuracy: 0.8218 – val_loss: 0.4536 – val_accuracy: 0.8409
Epoch 2/5
1875/1875 [==================] – 18s – 10ms/step – loss: 0.3824 –
accuracy: 0.8596 – val_loss: 0.3660 – val_accuracy: 0.8665
Epoch 3/5
1875/1875 [==================] – 17s – 9ms/step – loss: 0.3479 –
accuracy: 0.8712 – val_loss: 0.3763 – val_accuracy: 0.8634
Epoch 4/5
1875/1875 [==================] – 17s – 9ms/step – loss: 0.3275 –
accuracy: 0.8791 – val_loss: 0.3577 – val_accuracy: 0.8709
Epoch 5/5
1875/1875 [==================] – 21s – 11ms/step – loss: 0.3112 –
accuracy: 0.8849 – val_loss: 0.3420 – val_accuracy: 0.8763
```

Base Model (ai.energy module model)

```
power-consumption = ai.energy.linear_model.LinearRegression()
power-consumption.fit(X_train, y_train)
power-predictions = power-consumption.predict(X_val)
```

1103

User-Developed TensorFlow/sklearn Model

```
power-consumption = sklearn.linear_model.LinearRegression()
power-consumption.fit(X_train, y_train)
power-predictions = power-consumption.predict(X_val)
```

FIG. 11

CONTROLLING EXECUTION OF ARTIFICIAL INTELLIGENCE WORKLOADS BASED ON PREDICTED POWER CONSUMPTION

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for controlling execution of artificial intelligence workloads based on predicted power consumption of the artificial intelligence workloads.

In one embodiment, an apparatus comprises at least one processing device comprising a processor coupled to a memory. The at least one processing device is configured to determine, for a first set of one or more artificial intelligence workloads, a first set of metrics characterizing one or more artificial intelligence models utilized by the first set of one or more artificial intelligence workloads and a second set of metrics characterizing power consumption associated with execution of the first set of one or more artificial intelligence workloads. The at least one processing device is also configured to generate, based at least in part on the first set of metrics and the second set of metrics, a predictive model configured for generating predictions of power consumption associated with execution of a second set of one or more artificial intelligence workloads, and to utilize the predictive model to generate, for a given one of the second set of one or more artificial intelligence workloads, at least one predicted power consumption associated with execution of the given one of the second set of one or more artificial intelligence workloads on one or more information technology assets. The at least one processing device is further configured to control execution of the given one of the second set of one or more artificial intelligence workloads on at least a given one of the one or more information technology assets based at least in part on the at least one predicted power consumption.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for controlling execution of artificial intelligence workloads based on predicted power consumption of the artificial intelligence workloads in an illustrative embodiment.

FIG. 3 shows an artificial intelligence workload power consumption analysis tool in an illustrative embodiment.

FIG. 4 shows collection of artificial intelligence and machine learning metrics from a compute server running an artificial intelligence software framework in an illustrative embodiment.

FIG. 6 shows a process flow for generating a power consumption model for artificial intelligence workloads utilizing the artificial intelligence workload power consumption analysis tool of FIG. 3 in an illustrative embodiment.

FIG. 7 shows an example of pseudocode for implementing a base power consumption model for artificial intelligence workloads in an illustrative embodiment.

FIG. 8 shows tables of artificial intelligence and infrastructure metadata utilize for generating a power consumption model for artificial intelligence workloads in an illustrative embodiment.

FIG. 9 shows training of a power consumption model for artificial intelligence workloads in an illustrative embodiment.

FIG. 11 shows examples of pseudocode for implementing base power consumption models for artificial intelligence workloads in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
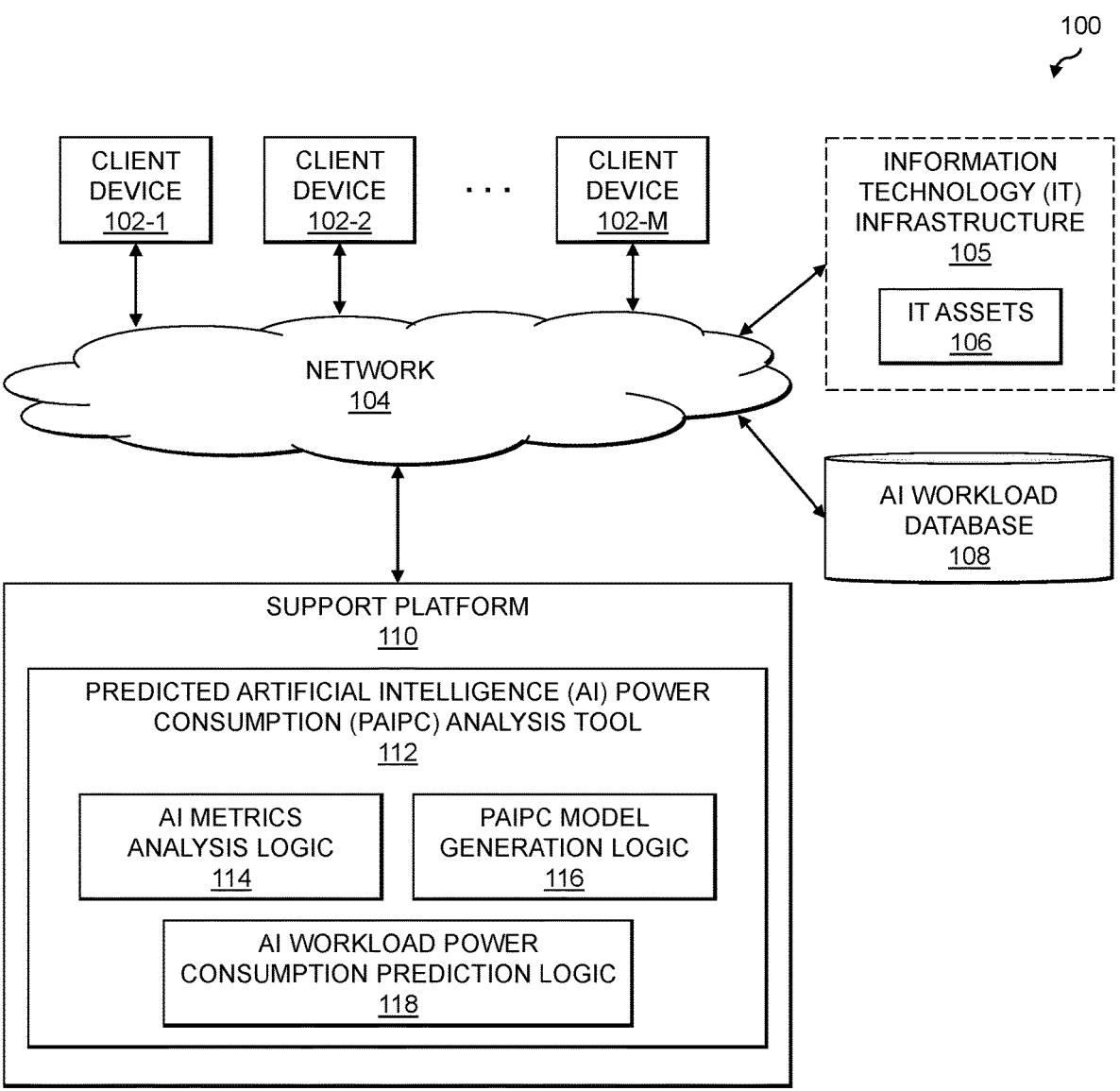
FIG. 1 is a block diagram of an information processing system configured for controlling execution of artificial intelligence workloads based on predicted power consumption of the artificial intelligence workloads in an illustrative embodiment.

FIG. 1 shows an information processing system 100 configured in accordance with an illustrative embodiment. The information processing system 100 is assumed to be built on at least one processing platform and provides functionality for controlling execution of artificial intelligence (AI) workloads based on predicted power consumption of the AI workloads. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an AI workload database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing a set of IT assets, such as the IT assets 106 of the IT infrastructure 105. For example, users of the client devices 102 may submit queries to the support platform 110 to perform intelligent analysis of AI workloads that are to be run on the IT assets 106 of the IT infrastructure 105 so as to, for example, predict or estimate the power consumption of the AI workloads and possibly adjust the AI workloads or the configurations of the IT assets 106 on which the AI workloads are to be run to achieve more efficient power consumption. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The AI workload database 108 is configured to store and record various information that is utilized by the support platform 110 and the client devices 102. Such information may include, for example, information that is collected regarding operation of the IT assets 106 of the IT infrastructure 105 (e.g., AI and infrastructure metrics and metadata, etc.), machine learning or other AI models used for analyzing and predicting power consumption by AI workloads, etc. The AI workload database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to perform analysis of the power consumption of AI workloads that have or will be run on IT assets such as the IT assets 106 of the IT infrastructure 105. In some embodiments, the client devices 102 are assumed to be associated with software developers, system administrators, IT managers or other authorized personnel responsible for managing the IT assets 106 of the IT infrastructure 105. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support functionality for multiple different customers, businesses, etc.). Various other examples are possible.

In some embodiments, the client devices 102 and/or the IT assets 106 of the IT infrastructure 105 may implement host agents that are configured for automated transmission of information with the AI workload database 108 and the support platform 110 regarding AI workloads (e.g., that have or will be run on the IT assets 106 of the IT infrastructure 105). It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the search engine platform 110. In the FIG. 1 embodiment, the support platform 110 implements a predicted AI power consumption (PAIPC) analysis tool 112. The PAIPC analysis tool 112 comprises AI metrics analysis logic 114, PAIPC model generation logic 116, and AI workload power consumption prediction logic 118. As discussed above, the client devices 102 and/or the IT assets 106 may access the support platform 110 to perform various tasks, including analysis of AI or machine learning workloads that have or are to be run. The PAIPC analysis tool 112 is configured to provide functionality for analyzing the power consumption of AI workloads, and for predicting future power consumption of AI workloads that are to be run on the IT assets 106 of the IT infrastructure 105. The PAIPC analysis tool 112 utilizes the AI metrics analysis logic 114 to import or otherwise collect various metrics which may be used to tune a power consumption prediction model specific to one or more designated types of AI workloads and/or to specific IT assets on which the AI workloads will be run. The metrics may include AI metrics (e.g., details on the architecture of AI or other machine learning software that runs AI workloads, details regarding previous runs of instances of different AI or other machine learning software, etc.) as well as infrastructure metrics (e.g., hardware and software characteristics of the IT assets 106 on which the AI workloads have or will be run). The PAIPC model generation logic 116 is configured to utilize the AI and infrastructure metrics to generate a customized or tuned power consumption prediction model (e.g., a PAIPC model), and the AI workload power consumption prediction logic 118 is configured to utilize the generated PAIPC model to predict the power consumption of AI workloads on different ones of the IT assets 106. The PAIPC analysis tool 112 can utilize such predictions to generate intelligent recommendations on where to deploy AI workloads (e.g., to select among different available ones of the IT assets 106 on which to execute a particular AI workload), on how to adjust or modify AI workloads to achieve more efficient power consumption, etc.

At least portions of the PAIPC analysis tool 112, the AI metrics analysis logic 114, the PAIPC model generation logic 116, and the AI workload power consumption prediction logic 118 may be implemented at least in part in the form of software that is stored in memory and executed by a processor.

It is to be appreciated that the particular arrangement of the client devices 102, the IT infrastructure 105, the AI workload database 108 and the support platform 110 illustrated in the FIG. 1 embodiment is presented by way of example only, and alternative arrangements can be used in other embodiments. As discussed above, for example, the support platform 110 (or portions of components thereof, such as one or more of the PAIPC analysis tool 112, the AI metrics analysis logic 114, the PAIPC model generation logic 116, and the AI workload power consumption prediction logic 118) may in some embodiments be implemented internal to the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the AI workload database 108 and the support platform 110 or components thereof (e.g., the PAIPC analysis tool 112, the AI metrics analysis logic 114, the PAIPC model generation logic 116, and the AI workload power consumption prediction logic 118) may be implemented on respective distinct processing platforms, although numerous other arrangements are possible. For example, in some embodiments at least portions of the support platform 110 and one or more of the client devices 102, the IT infrastructure 105, the IT assets 106 and/or the AI workload database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the AI workload database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 13 and 14.

It is to be understood that the particular set of elements shown in FIG. 1 for controlling execution of AI workloads based on predicted power consumption of the AI workloads is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for controlling execution of AI workloads based on predicted power consumption of the AI workloads will now be described in more detail with reference to the flow diagram of FIG. 2. It is to be understood that this particular process is only an example, and that additional or alternative processes for controlling execution of AI workloads based on predicted power consumption of the AI workloads may be used in other embodiments.

In this embodiment, the process includes steps 200 through 206. These steps are assumed to be performed by the support platform 110 utilizing the PAIPC analysis tool 112, the AI metrics analysis logic 114, the PAIPC model generation logic 116, and the AI workload power consumption prediction logic 118. The process begins with step 200, determining, for a first set of one or more AI workloads, a first set of metrics characterizing one or more AI models utilized by the first set of one or more AI workloads and a second set of metrics characterizing power consumption associated with execution of the first set of one or more AI workloads.

The first set of metrics may comprise, for a given one of the first set of one or more AI workloads utilizing a given one of the one or more AI models, at least one of: an AI platform of the given AI model; a data set size of a data set processed by the given AI model for the given one of the first set of one or more AI workloads; a machine learning architecture of the given AI model; a start time of execution of the given one of the first set of one or more AI workloads utilizing the given AI model; and a stop time of execution of the given one of the first set of one or more AI workloads utilizing the given AI model.

The second set of metrics may comprise, for a given one of the first set of one or more AI workloads, at least one of: central processing unit (CPU) information characterizing at least one of a CPU model and a CPU count of one or more CPUs utilized for executing the given one of the first set of one or more AI workloads; graphical processing unit (GPU) information characterizing at least one of a GPU model and a GPU count of one or more GPUs utilized for executing the given one of the first set of one or more AI workloads; memory information characterizing available memory of IT infrastructure utilized for executing the given one of the first set of one or more AI workloads; thermal information characterizing thermals of one or more hardware components utilized for executing the given one of the first set of one or more AI workloads; and location information characterizing location of IT infrastructure utilized for executing the given one of the first set of one or more AI workloads.

The FIG. 2 process continues with step 202, generating, based at least in part on the first set of metrics and the second set of metrics, a predictive model configured for generating predictions of power consumption associated with execution of a second set of one or more AI workloads.

In step 204, the predictive model is utilized to generate, for a given one of the second set of one or more AI workloads, at least one predicted power consumption associated with execution of the given one of the second set of one or more AI workloads on one or more IT assets. At least one of the first set of one or more AI workloads was executed utilizing the same or a different set of one or more IT assets that that for which the power consumption prediction is generated in step 204. In some embodiments, the first set of one or more AI workloads utilize one or more AI models of a first type and the given one of the second set of one or more AI workloads utilizes one or more AI models of a second type, the second type being different than the first type. The first and second sets of one or more AI workloads may comprise at least one of: training one or more AI models, tuning the one or more AI models, and performing inference utilizing the one or more AI models.

In step 206, execution of the given one of the second set of one or more AI workloads on at least a given one of the one or more IT assets is controlled based at least in part on the at least one predicted power consumption. In some embodiments, step 204 includes generating two or more predicted power consumptions associated with execution of the given one of the second set of one or more AI workloads on two or more different IT assets, and step 206 includes selecting the given IT asset based at least in part on the two or more predicted power consumptions.

In some embodiments, responsive to the at least one predicted power consumption exceeding a designated power consumption threshold, step 206 includes adjusting the given one of the second set of one or more AI workloads. Adjusting the given one of the second set of one or more AI workloads may comprise limiting a number of runs of a given AI model utilized by the given one of the second set of one or more AI workloads. Adjusting the given one of the second set of one or more AI workloads may also or alternatively comprise at least one of: adjusting a number of epochs utilized in training a given AI model utilized by the given one of the second set of one or more AI workloads; adjusting a target accuracy parameter utilized in training the given AI model utilized by the given one of the second set of one or more AI workloads; and adjusting a number of trainable parameters of the given AI model utilized by the given one of the second set of one or more AI workloads. Adjusting the given one of the second set of one or more AI workloads may further or alternatively comprise adjusting at least one of a number and a type of one or more layers of a given AI model utilized by the given one of the second set of one or more AI workloads.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for generating different power consumption prediction models, for analyzing different AI workloads, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions for determining the electrical power consumption for running different AI workloads (e.g., performing training, fine-tuning or inference utilizing one or more machine learning (ML) or other AI models), and for utilizing such information to predict or estimate the electrical power consumption required for running new AI workloads on a given infrastructure (e.g., one or more designated IT assets).

While it is difficult to determine the combined contribution that AI/ML have to climate change, it is estimated that Information Communication Technology (ICT) accounts for approximately 1.4% of annual greenhouse gas emissions. Most of this is emanating from electrical power consumption. The consequences of growing AI/ML adoption, the large compute requirements for certain types of AI/ML models (e.g., such as generative AI (GenAI) models), and the use of larger and more complex models, have resulted in a growing power consumption profile for compute and hardware accelerator infrastructure. While ICT emissions for AI/ML may seem small, the computing power required for state-of-the-art AI/ML model performance is on a consistently upward trajectory. To manage these power requirements, a consistent measurement/logging mechanism is needed. With a sufficient data set of historic infrastructure AI/ML power consumption, future power consumption models for AI/ML resources can then be leveraged. The technical solutions described herein provide functionality for power logging and reporting associated with execution of AI workloads, and for predicting power consumption for new AI workloads.

The technical solutions described herein provide an approach for collecting relevant AI/ML data (e.g., from execution of historical AI workloads), and for utilizing this data to make power consumption predictions for future AI workloads. FIG. 3 shows an AI workload power consumption analysis tool 301 (e.g., an example implementation of the PAIPC tool 112) implementing a power consumption data import module 303, a power consumption data collection and analysis module 305, a power consumption model generation and deployment module 307, and AI workload power consumption prediction and adjustment module 309. The power consumption data import module 303 is configured to import a predefined AI energy module into an existing AI/ML code structure. The power consumption data collection and analysis module 305 is configured to record, log and analyze pertinent AI/ML and infrastructure data. The power consumption model generation and deployment module 307 is configured to build power consumption models and deploy them for use (e.g., by end users). The AI workload power consumption prediction and adjustment module 309 is configured to generated predictions or estimates of likely infrastructure power consumption for AI workloads (e.g., training of an AI/ML model, performing inference using an AI/ML model, performing fine-tuning of an AI/ML model, etc.). The AI workload power consumption prediction and adjustment module 309 is also configured to adjust generated power consumption models for a given prediction with suitable power reduction modeling alternatives (e.g., adjusting model type, model complexity, dropout, number of epochs, etc.).

FIG. 4 shows a system 400 in which the AI workload power consumption analysis tool 301 may be utilized. The system 400 includes a compute server 401 which runs an AI software framework 403 associated with AI software framework application programming interface (API) 430. The compute server 401 also runs an out-of-band management (OOBM) tool 405 (e.g., a Dell Integrated Remote Access Controller (iDRAC) or other remote access controller) associated with an OOBM tool API 450. The OOBM tool 405 is configured to generate OOBM logs 452, which include various metrics including AI metrics and infrastructure metrics such as power, thermal, central processing unit (CPU), graphical processing unit (GPU), etc. The AI metrics include one or more AI energy logs including AI energy log 453, which includes AI metadata and infrastructure metadata. The AI energy log 453 include details regarding runs of AI workloads (e.g., power, duration, accuracy, number of epochs, data size, model architecture, etc.) as well as infrastructure details for the runs of the AI workloads (e.g., the hardware and software configuration of the compute server 401 on which the AI workloads were run). The AI software framework API 430 is configured to access the OOBM tool API 450 to obtain at least a portion of the OOBM logs 452 (e.g., AI energy logs including the AI energy log 453). The AI software framework API 430 implements a base AI model 431, which is customized utilizing power consumption metrics data 433 in order to provide a customized AI model for generating power consumption predictions or estimates for future AI workloads (e.g., that are to be run by the AI software framework 403 on the compute server 401).

The base AI model 431 provides an AI/ML module (e.g., an API/software library) referred to as "ai.energy" which is used to, among other tasks, identify relevant metadata (e.g., CPU, GPU, model complexity, etc.) and measure and record metadata that is captured utilizing the OOBM tool 405. This advantageously provides metrics localization, where data is available on the infrastructure (e.g., compute server 401) on which historical AI workloads ran on, without a need to access a remote repository. The OOBM tool 405 may be configured to maintain historic power consumption data for the compute server 401, such as information regarding power supply status and characteristics (e.g., input wattage, output wattage both rated and actual, firmware (FW) version, part number, input line type, etc.), power consumption (e.g., historical trends including average usage, max peak power usage, max peak power usage time, minimum peak power usage, minimum peak power usage time, present power readings and thresholds, power supply unit readings, raw power consumption, cumulative readings of time and total power usage, etc.), etc. The OOBM tool 405 may also be configured to generate visualizations of power consumption data.

Figure 5:
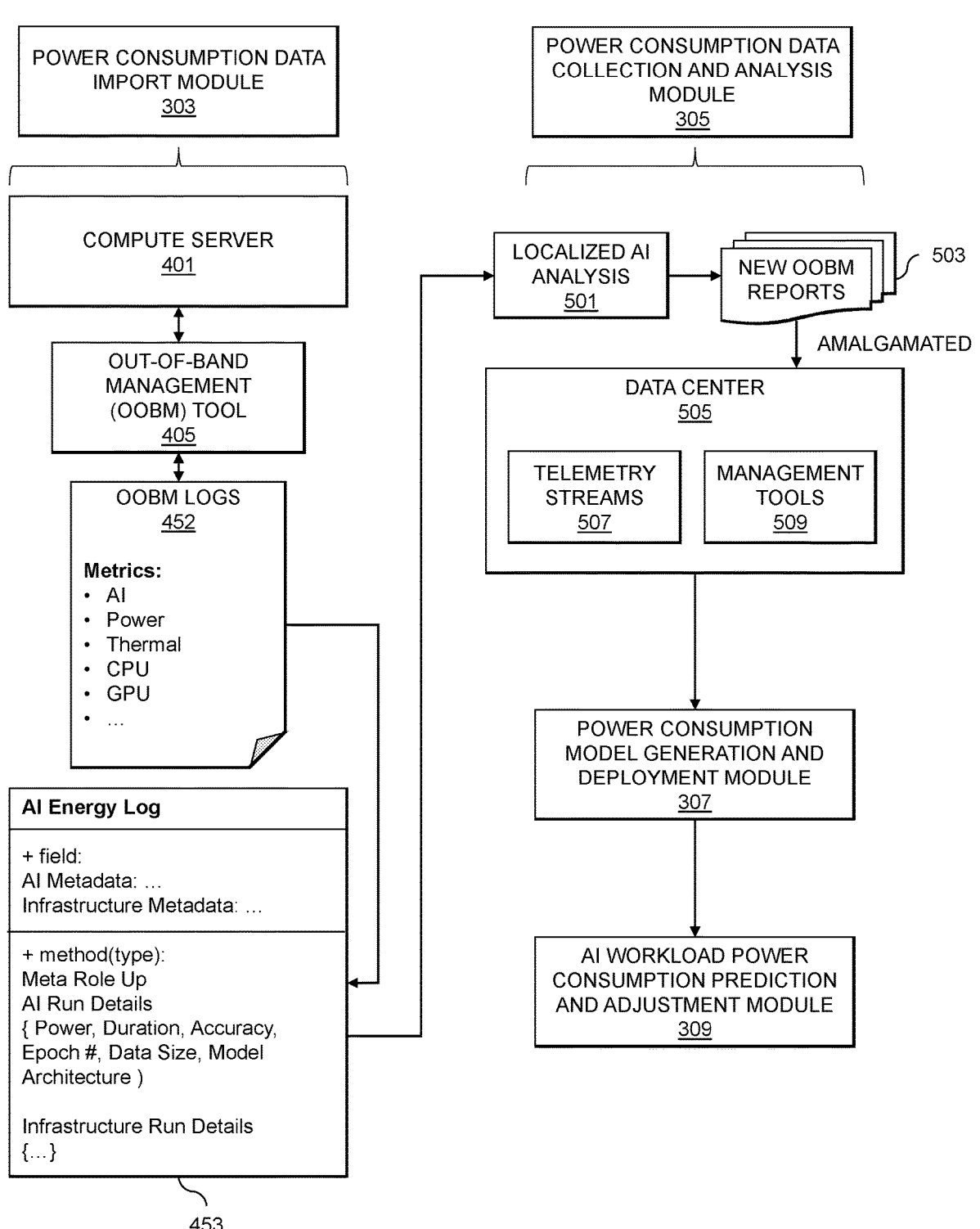
FIG. 5 shows a process flow for importing artificial intelligence and machine learning metrics utilizing the artificial intelligence workload power consumption analysis tool of FIG. 3 in an illustrative embodiment.

FIG. 5 shows a system flow for implementation of the AI workload power consumption analysis tool 301 in the system 400, where the power consumption data import module 303 is configured to obtain AI energy log 453 from the compute server 401 via the OOBM tool 405 (e.g., using the OOBM tool API 450, not shown in FIG. 5). The power consumption data collection and analysis module 305 is configured to perform localized AI analysis 501 (e.g., of the AI energy log 453) to generate one or more new OOBM reports 503, which are amalgamated and analyzed at a data center 505 level. The data center 505 may include a collection of servers (e.g., including compute server 401) or other types of IT assets. The data center 505 utilizes one or more telemetry streams 507 and management tools 509 (e.g., Dell OpenManage). Thus, the AI workload power consumption data can be viewed through reporting capabilities based on OOBM data both at the server level (e.g., compute server 401 utilizing OOBM tool 405) and at the data center level (e.g., data center 505 utilizing the telemetry streams 507 and management tools 509). The OOBM data, whether at the server level, the data center level, or both, is leveraged by the power consumption model generation and deployment module 307 to train a PAIPC model to predict the likely power consumption for future AI workloads.

FIG. 6 shows a system flow for training a PAIPC model to predict the likely power consumption of future AI workloads utilizing the power consumption model generation and deployment module 307. Such future AI workloads may involve various tasks, such as model training, inference, fine-tuning, etc. The predictions may be generated for specific infrastructure (e.g., for a specific server such as compute server 401 or some other designated set of one or more IT assets). The system flow includes ingesting data in block 601, where the ingested data in this example includes a power consumption data set 610 (e.g., generated by the power consumption data collection and analysis module 305 utilizing data obtained via the power consumption data import module 303). The power consumption data set 610 is in the form of a table structure with columns for run number, power consumed, duration, epoch number, accuracy, model architecture, and number of examples. In block 603, a power consumption model 630 is trained utilizing the power consumption data set 610. In block 605, inference or reporting is performed utilizing the power consumption model 630. This includes generation of predictions 650 (e.g., power consumption predictions for a set of model configurations) and deployment options 652 (e.g., integrate with a remote access controller such as a Dell iDRAC or other OOBM tool, integrate with an AI training pipeline, integrate with a monitoring platform such as Dell CloudIQ, etc.).

Analyzing and managing power consumption, both at the server and data center level, are complex tasks. Various approaches may be used to address the inherent inefficiencies in operating a single server to single workload configuration, with virtualization and more recently containerization being deployed to address this problem. Such virtualization and containerization technologies enable the ability to distribute workloads, including AI workloads, across infrastructures. Unfortunately, the more distributed a workload becomes, the harder it becomes to understand and categorize the infrastructure to workload mix (e.g., whether server X primarily runs AI workloads or other types of workloads, determining the percentage of a data center power consumption that is attributable to running AI workloads, etc.).

With AI/ML adoption growing and increases in AI/ML model complexity and compute/accelerator power requirements on the rise, the ability to delineate the power consumed and predict the likely power consumption of AI workloads presents various technical challenges for infrastructure providers and AI practitioners. Some technologies may be used to help analyze, visualize and reduce power consumption related to general computational requirements in the ICT sector. Such technologies, however, are limited in scope and do not provide functionality for analyzing AI workloads. The technical solutions described herein may integrate AI/ML power consumption logging and analysis into the very infrastructure that is used to run AI workloads, offering the unique ability to delineate power consumption of AI workloads from other infrastructure workloads.

As discussed above, the AI workload power consumption analysis tool 301 utilizes the power consumption data import module 303 to import a predefined AI energy module into an existing AI/ML code structure. In some embodiments, the predefined AI energy module is referred to as "ai.energy" and is available to be imported into various AI/ML frameworks such as TensorFlow, Keras, Pytorch, etc. The ai.energy module provides various functionality, such as exposing the infrastructure telemetry and logging capabilities of the underlying hardware of IT assets on which AI workloads run, capturing pertinent AI metadata, capturing pertinent hardware or infrastructure metadata, creating a historic AI/ML infrastructure dataset, and creating a PAIPC model configured to predict future power consumption for a given AI workload. FIG. 7 shows an example of pseudocode 700 for implementing the ai.energy module as well as a table 705 describing the functionality of different portions of the pseudocode 700.

Data generation may be a multi-step process. Initially, temporary metadata may be created at runtime (e.g., collecting pertinent AI/ML data and infrastructure data). Upon completion of an AI workload, a final data set is generated and logged to be subsequently used to generate a PAIPC model for a given infrastructure (e.g., a set of one or more IT assets). FIG. 8 shows examples of AI metadata 800 and infrastructure metadata 805 which is collected for each run of an AI workload. FIG. 9 shows a table 900 including a sample training set generated utilizing the power consumption data collection and analysis module 305 (e.g., utilizing AI and infrastructure metadata such as that shown in FIG. 8). For each AI workload that utilizes the ai.energy module, a complete datum/record is added to the data set. The table

900 shows how an example record including features such as run number, duration, epoch number, accuracy, model architecture, AI metadata, infrastructure metadata, number of examples and power consumed is used to train a PAIPC model in block 905. The table 900 and block 905 show the output of the model.summary( ) and model.traino/model.fit( ) commands of an AI framework, detailing the model architecture, including layer composition, shape of the data set, number of parameters, and accuracy of each training epoch. This data can be further processed or tokenized into suitable trainable features for a PAIPC model.

Once a suitable data set is available, the building and deployment of a PAIPC model is performed utilizing the power consumption model generation and deployment module 307. In some embodiments, the power consumption model generation and deployment module 307 takes into account user-defined specifications such as a particular AI/ML framework to use, model selection, accuracy requirements, where and how to deploy a finalized PAIPC model, etc. The AI workload power consumption prediction and adjustment module 309 is configured to utilize the generated PAIPC model as desired (e.g., to provide an awareness of historical AI workload power consumption, to predict likely power consumption of future AI workloads, etc.).

Not all AI workloads are created equal, and not all AI/ML models carry the same importance or requirements for different parameters such as accuracy (e.g., a higher accuracy may be needed for medical diagnostic predictions as compared with recommended music playlists). The generated PAIPC models allow end users to predict, at run time, tradeoffs between execution of AI workloads and the predicted power that executing such AI workloads entails (e.g., tradeoffs between more training epochs for an AI/ML model and the predicted power consumption that such training epochs entail).

Figure 10:
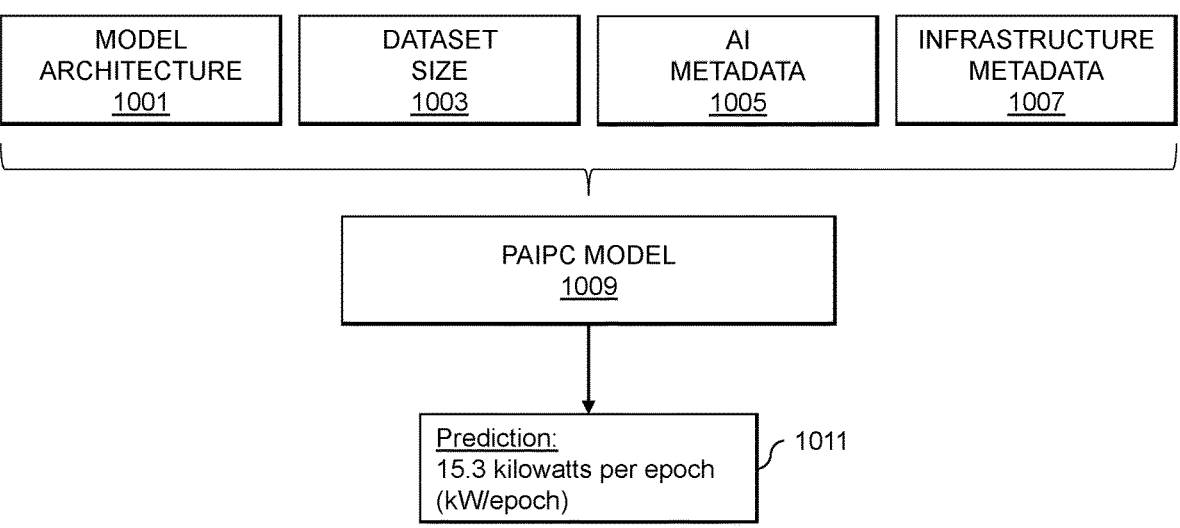
FIG. 10 shows a system flow for generating and utilize a power consumption model for artificial intelligence workloads in an illustrative embodiment.

FIG. 10 shows a system flow 1000, where a set of inputs including a user-specified model architecture 1001, a dataset size 1003, AI metadata 1005 and infrastructure metadata 1007 are used to generate a PAIPC model 1009, which is utilized to generate power consumption predictions such as prediction 1011 (e.g., that each epoch of training an AI/ML model will consume 15.3 kilowatts (kW)). For example, based on all the inputs (e.g., the user-specified model architecture 1001, the dataset size 1003, the AI metadata 1005 and the infrastructure metadata 1007), it is possible to generate the PAIPC model 1009 for predicting the power required per training epoch (e.g., prediction 1011), which provides insights allowing a data scientist or other user to plan a model training process for an AI/ML model. The data scientist or other user can use the power prediction data (e.g., prediction 1011) to determine whether to adjust the user-specific model architecture 1001 (e.g., to try to eliminate extra layers to be more efficient from a power consumption perspective). Thus, the PAIPC model 1009 may be updated in response to changes in the inputs such as changes to the user-specified model architecture 1001. Further, the power prediction data (e.g., prediction 1011) can be used to enforce limits on power consumption for AI workloads (e.g., a training run for an AI/ML model). At the start of training, the data scientist or other user may specify the number of planned epochs, and the PAIPC model 1009 may be used to predict how many epochs may be executed before breaking power consumption limits set by infrastructure administrators.

Figure 12:
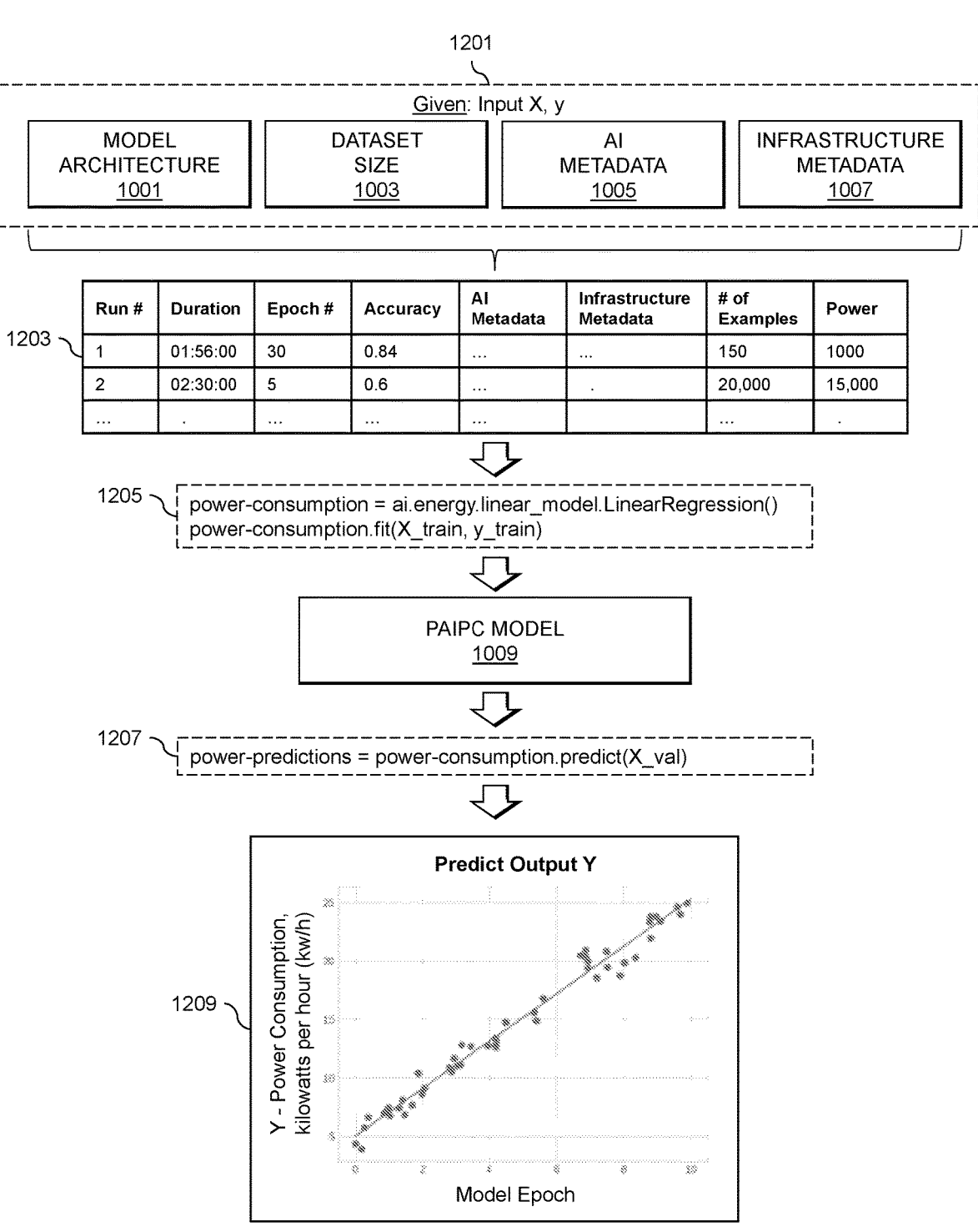
FIG. 12 shows a process flow for generation of predicted power consumption for an artificial intelligence workload utilizing the system flow of FIG. 11 in an illustrative embodiment.

In some embodiments, the AI workload power consumption analysis tool 301 may include a base AI model that can be customized as needed by applying transfer learning. In other embodiments, the AI workload power consumption analysis tool 301 may utilize a model that is user-developed (e.g., a regression model). FIG. 11 shows pseudocode examples of a base model 1101 (e.g., the ai.energy module) and a user-developed model 1103 (e.g., a TensorFlow/sklearn model). FIG. 12 shows an example of executing the system flow 1000 utilizing the base model 1101, where input 1201 is given including the user-specified model architecture 1001, the dataset size 1003, the AI metadata 1005 and the infrastructure metadata 1007. The input 1201 is used to generate a power consumption data set 1203, and a portion 1205 of the pseudocode of the base model 1101 is then executed to generate the PAIPC model 1009 (e.g., a customized version of the base model 1101 generated via transfer learning utilizing the power consumption data set 1203). Another portion 1207 of the pseudocode of the base model 1101 is then executed to generate power consumption predictions 1209, shown in the form of a plot visualization of the predicted power consumption as a function of the number of model epochs.

Various example use cases will now be described. Consider, by way of example, adjusting a given AI workload based on predicted power consumption of the given AI workload. In this scenario, historic power consumption data for AI workloads on an existing infrastructure (e.g., a given set of one or more IT assets) is used to train a PAIPC model to predict the likely power consumption for the given AI workload prior to run time of the given AI workload. Based on the predicted power consumption for the given AI workload, the user could tailor the workload accordingly (e.g., by adjusting model complexity, adjusting model accuracy requirements, etc.).

Consider, as another example, providing AI workload power consumption insights. Infrastructure professionals may want to better understand their infrastructure power consumption profile, and can use various reporting technologies to provide insights for AI workload power consumption data. In this scenario, historic power consumption data for AI workloads on an existing infrastructure (e.g., one or more sets of one or more IT assets) is used to train a PAIPC model. The PAIPC model may be used to evaluate different sets of one or more IT assets on which AI workloads may be run. This may be used to allow the infrastructure professionals or other users to select a specific set of one or more IT assets (e.g., a specific server/data center) and to delineate its AI workload power consumption profile from an overall power consumption profile (e.g., including AI and other workloads). The PAIPC model may also utilize power consumption reporting to optimize AI workload placement on a specific set of one or more IT assets, or to limit (e.g., using Quality of Service (QoS) metrics) the actions of users who run AI workloads that consume excessive amounts of power.

The technical solutions described herein provide an AI/ML-based solution for recording, analyzing and predicting the power consumption of AI workloads. Advantageously, the technical solutions are able to generate PAIPC models which are specific to the particular infrastructure (e.g., IT assets) on which AI workloads are to be run, allowing for more accurate predictions of AI power consumption down to an individual epoch level. Further, the technical solutions are advantageously able to create synchronized infrastructure and AI data sets though a novel data collection process which, at an infrastructure level, gathers fine-grained AI metrics associated to specific AI workloads. This integration of AI and infrastructure metrics collection processes provides various technical advantages.

The technical solutions are also advantageously able to perform feature extraction from model architectures. Interpreting and extracting features from the model architectures enables the technical solutions to train a PAIPC model that can generalize to different network architectures to predict performance on unseen hardware infrastructure. The technical solutions are further able to train PAIPC models based on a set of observed AI/ML model architectures (e.g., convolutional neural network (CNN), long short term memory (LSTM), etc.) which can then be used to generalize to other AI/ML model architectures (e.g., recurrent neural network (RNN), large language model (LLM), etc.). If a particular hardware infrastructure has only previously been training on data based on a CNN model architecture, a generalized PAIPC model can be used to predict power consumption performance for AI workloads that utilize an RNN model architecture. Further, contingent on user agreement, the technical solutions offer the ability to generate and curate large power consumption data sets including infrastructure and AI metrics collected across multiple users and/or infrastructures.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling execution of AI workloads based on predicted power consumption of the AI workloads will now be described in greater detail with reference to FIGS. 13 and 14. Although described in the context of system 100, these platforms may also be used to implement at least portions of other information processing systems in other embodiments.

Figure 13:
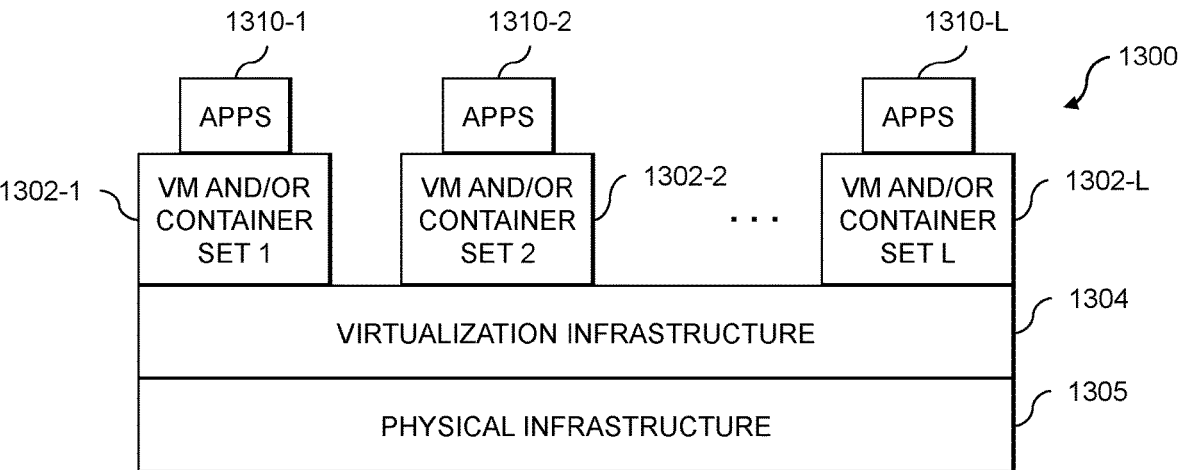
FIGS. 13 and 14 show examples of processing platforms that may be utilized to implement at least a portion of an information processing system in illustrative embodiments.
Figure 14:
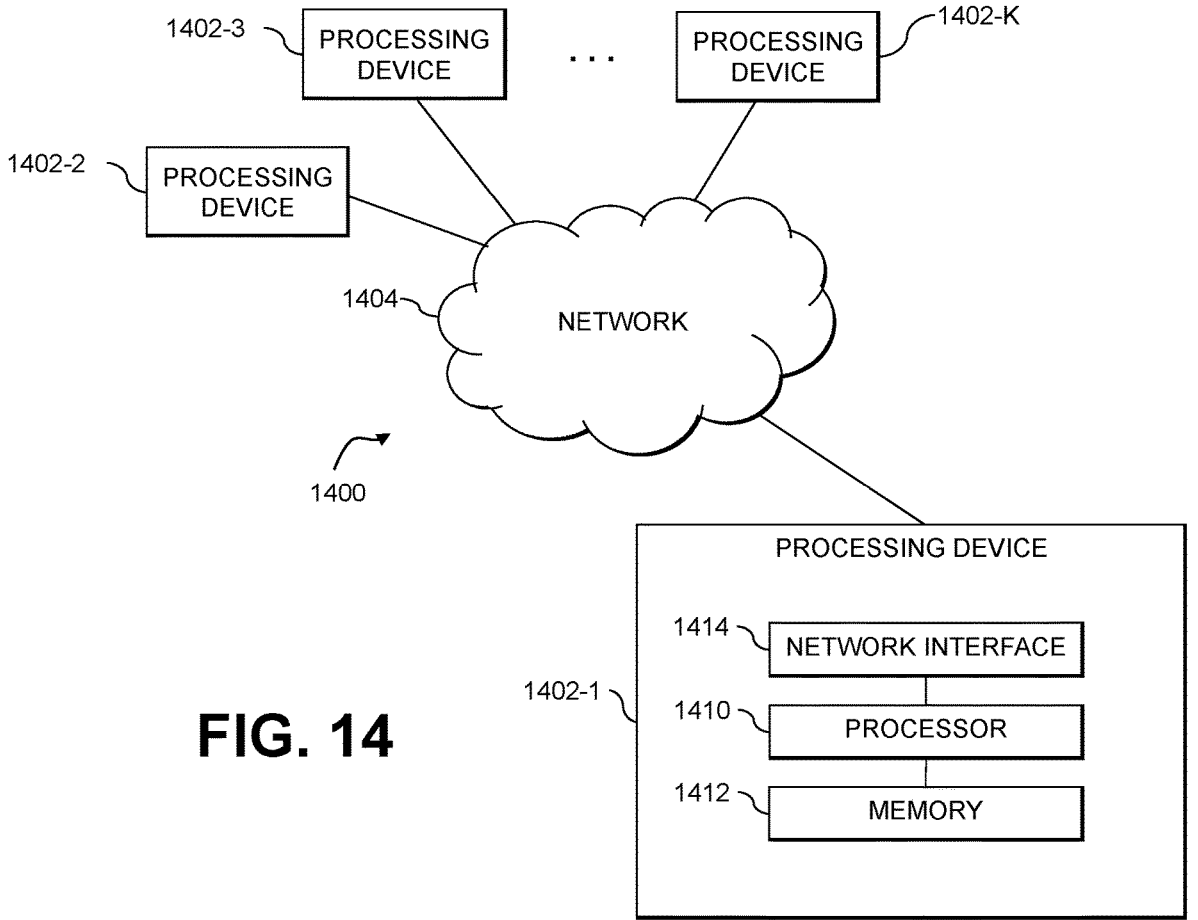

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for controlling execution of AI workloads based on predicted power consumption of the AI workloads as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
  to determine, for a first set of one or more artificial intelligence workloads, a first set of metrics characterizing one or more artificial intelligence models utilized by the first set of one or more artificial intelligence workloads and a second set of metrics characterizing power consumption associated with execution of the first set of one or more artificial intelligence workloads;
  to generate, based at least in part on the first set of metrics and the second set of metrics, a predictive model configured for generating predictions of power consumption associated with execution of a second set of one or more artificial intelligence workloads;
  to utilize the predictive model to generate, for a given one of the second set of one or more artificial intelligence workloads, at least one predicted power consumption associated with execution of the given one of the second set of one or more artificial intelligence workloads on one or more information technology assets, the given one of the second set of one or more artificial intelligence workloads comprising training a given artificial intelligence model, the at least one predicted power consumption associated with the execution of the given one of the second set of one or more artificial intelligence workloads on the one or more information technology assets comprising a per training epoch power consumption prediction for each training epoch of training the given artificial intelligence model;

to determine a training process for the training the given artificial intelligence model based at least in part on the per training epoch power consumption prediction for each training epoch of training the given artificial intelligence model; and to control execution of the given one of the second set of one or more artificial intelligence workloads on at least a given one of the one or more information technology assets based at least in part on the at least one predicted power consumption and the determined training process for the training of the given artificial intelligence model.

2. The apparatus of claim 1 wherein the first set of metrics comprise, for a given one of the first set of one or more artificial intelligence workloads utilizing a given one of the one or more artificial intelligence models, at least one of:

an artificial intelligence platform of the given artificial intelligence model;

a data set size of a data set processed by the given artificial intelligence model for the given one of the first set of one or more artificial intelligence workloads; and a machine learning architecture of the given artificial intelligence model.

3. The apparatus of claim 1 wherein the first set of metrics comprise, for a given one of the first set of one or more artificial intelligence workloads utilizing a given one of the one or more artificial intelligence models, at least one of:

a start time of execution of the given one of the first set of one or more artificial intelligence workloads utilizing the given artificial intelligence model; and a stop time of execution of the given one of the first set of one or more artificial intelligence workloads utilizing the given artificial intelligence model.

4. The apparatus of claim 1 wherein the second set of metrics comprise, for a given one of the first set of one or more artificial intelligence workloads, at least one of:

central processing unit information characterizing at least one of a central processing unit model and a central processing unit count of one or more central processing units utilized for executing the given one of the first set of one or more artificial intelligence workloads;

graphical processing unit information characterizing at least one of a graphical processing unit model and a graphical processing unit count of one or more graphical processing units utilized for executing the given one of the first set of one or more artificial intelligence workloads; and memory information characterizing available memory of information technology infrastructure utilized for executing the given one of the first set of one or more artificial intelligence workloads.

5. The apparatus of claim 1 wherein the second set of metrics comprise, for a given one of the first set of one or more artificial intelligence workloads, at least one of:

thermal information characterizing thermals of one or more hardware components utilized for executing the given one of the first set of one or more artificial intelligence workloads; and location information characterizing location of information technology infrastructure utilized for executing the given one of the first set of one or more artificial intelligence workloads.

6. The apparatus of claim 1 wherein at least one of the first set of one or more artificial intelligence workloads was executed utilizing the one or more information technology assets.

7. The apparatus of claim 1 wherein at least one of the first set of one or more artificial intelligence workloads was executed utilizing one or more additional information technology assets different than the one or more information technology assets.

8. The apparatus of claim 1 wherein the first set of one or more artificial intelligence workloads utilize one or more artificial intelligence models of a first type, and wherein the given one of the second set of one or more artificial intelligence workloads utilizes one or more artificial intelligence models of a second type, the second type being different than the first type.

9. The apparatus of claim 1 wherein the first and second sets of one or more artificial intelligence workloads comprise at least one of: training one or more artificial intelligence models, tuning the one or more artificial intelligence models, and performing inference utilizing the one or more artificial intelligence models.

10. The apparatus of claim 1 wherein:

utilizing the predictive model to generate the at least one predicted power consumption comprises generating two or more predicted power consumptions associated with execution of the given one of the second set of one or more artificial intelligence workloads on two or more different ones of the one or more information technology assets; and controlling execution of the given one of the second set of one or more artificial intelligence workloads comprises selecting the given one of the one or more information technology assets based at least in part on the two or more predicted power consumptions.

11. The apparatus of claim 1 wherein, responsive to the at least one predicted power consumption exceeding a designated power consumption threshold, controlling execution of the given one of the second set of one or more artificial intelligence workloads comprises adjusting the given one of the second set of one or more artificial intelligence workloads.

12. The apparatus of claim 11 wherein, adjusting the given one of the second set of one or more artificial intelligence workloads comprises limiting a number of training epochs for the training of the given artificial intelligence model.

13. The apparatus of claim 11 wherein, adjusting the given one of the second set of one or more artificial intelligence workloads comprises at least one of:

adjusting a number of training epochs utilized in the training of the given artificial intelligence model;

adjusting a target accuracy parameter utilized in training the given artificial intelligence model; and adjusting a number of trainable parameters of the given artificial intelligence model.

14. The apparatus of claim 11 wherein, adjusting the given one of the second set of one or more artificial intelligence workloads comprises adjusting at least one of a number and a type of one or more layers of the given artificial intelligence model.

15. A computer program product comprising a non-transitory processor-readable storage medium having stored therein program code of one or more software programs, wherein the program code when executed by at least one processing device causes the at least one processing device:

to determine, for a first set of one or more artificial intelligence workloads, a first set of metrics characterizing one or more artificial intelligence models utilized by the first set of one or more artificial intelligence workloads and a second set of metrics characterizing power consumption associated with execution of the first set of one or more artificial intelligence workloads;

to generate, based at least in part on the first set of metrics and the second set of metrics, a predictive model configured for generating predictions of power consumption associated with execution of a second set of one or more artificial intelligence workloads;

to utilize the predictive model to generate, for a given one of the second set of one or more artificial intelligence workloads, at least one predicted power consumption associated with execution of the given one of the second set of one or more artificial intelligence workloads on one or more information technology assets, the given one of the second set of one or more artificial intelligence workloads comprising training a given artificial intelligence model, the at least one predicted power consumption associated with the execution of the given one of the second set of one or more artificial intelligence workloads on the one or more information technology assets comprising a per training epoch power consumption prediction for each training epoch of training the given artificial intelligence model;

to determine a training process for the training the given artificial intelligence model based at least in part on the per training epoch power consumption prediction for each training epoch of training the given artificial intelligence model; and to control execution of the given one of the second set of one or more artificial intelligence workloads on at least a given one of the one or more information technology assets based at least in part on the at least one predicted power consumption and the determined training process for the training of the given artificial intelligence model.

16. The computer program product of claim 15 wherein the first and second sets of one or more artificial intelligence workloads comprise at least one of: training one or more artificial intelligence models, tuning the one or more artificial intelligence models, and performing inference utilizing the one or more artificial intelligence models.

17. The computer program product of claim 15 wherein, responsive to the at least one predicted power consumption exceeding a designated power consumption threshold, controlling execution of the given one of the second set of one or more artificial intelligence workloads comprises adjusting the given one of the second set of one or more artificial intelligence workloads.

18. A method comprising:

determining, for a first set of one or more artificial intelligence workloads, a first set of metrics characterizing one or more artificial intelligence models utilized by the first set of one or more artificial intelligence workloads and a second set of metrics characterizing power consumption associated with execution of the first set of one or more artificial intelligence workloads;

generating, based at least in part on the first set of metrics and the second set of metrics, a predictive model configured for generating predictions of power consumption associated with execution of a second set of one or more artificial intelligence workloads;

utilizing the predictive model to generate, for a given one of the second set of one or more artificial intelligence workloads, at least one predicted power consumption associated with execution of the given one of the second set of one or more artificial intelligence workloads on one or more information technology assets, the given one of the second set of one or more artificial intelligence workloads comprising training a given artificial intelligence model, the at least one predicted power consumption associated with the execution of the given one of the second set of one or more artificial intelligence workloads on the one or more information technology assets comprising a per training epoch power consumption prediction for each training epoch of training the given artificial intelligence model;

determining a training process for the training the given artificial intelligence model based at least in part on the per training epoch power consumption prediction for each training epoch of training the given artificial intelligence model; and controlling execution of the given one of the second set of one or more artificial intelligence workloads on at least a given one of the one or more information technology assets based at least in part on the at least one predicted power consumption and the determined training process for the training of the given artificial intelligence model;

wherein the method is performed by at least one processing device comprising a processor coupled to a memory.

19. The method of claim 18 wherein the first and second sets of one or more artificial intelligence workloads comprise at least one of: training one or more artificial intelligence models, tuning the one or more artificial intelligence models, and performing inference utilizing the one or more artificial intelligence models.

20. The method of claim 18 wherein, responsive to the at least one predicted power consumption exceeding a designated power consumption threshold, controlling execution of the given one of the second set of one or more artificial intelligence workloads comprises adjusting the given one of the second set of one or more artificial intelligence workloads.

* * * * *